(No Model.) 2 Sheets—Sheet 2.

P. K. DEDERICK.
WIRE BALE TIE MAKING MACHINE.

No. 562,123. Patented June 16, 1896.

Witnesses
J. M. Fowler Jr
Thomas Durant

Inventor
Peter K. Dederick,
by Church & Church
his Attorneys

UNITED STATES PATENT OFFICE.

PETER K. DEDERICK, OF LOUDONVILLE, NEW YORK.

WIRE-BALE-TIE-MAKING MACHINE.

SPECIFICATION forming part of Letters Patent No. 562,123, dated June 16, 1896.

Application filed February 5, 1895. Serial No. 537,365. (No model.)

*To all whom it may concern:*

Be it known that I, PETER K. DEDERICK, of Loudonville, county of Albany, State of New York, have invented Improvements in Machines for Manufacturing Bale-Ties from Wire, of which the following specification is a full description, reference being had to the accompanying drawings.

My improved machine is adapted to the manufacture of what is known as a "hook" or "cross-head," formed by folding the end of the wire into suitable shape; and it consists of two shafts or heads geared together, and provided with two projections on each for folding the wire.

Figure 1:
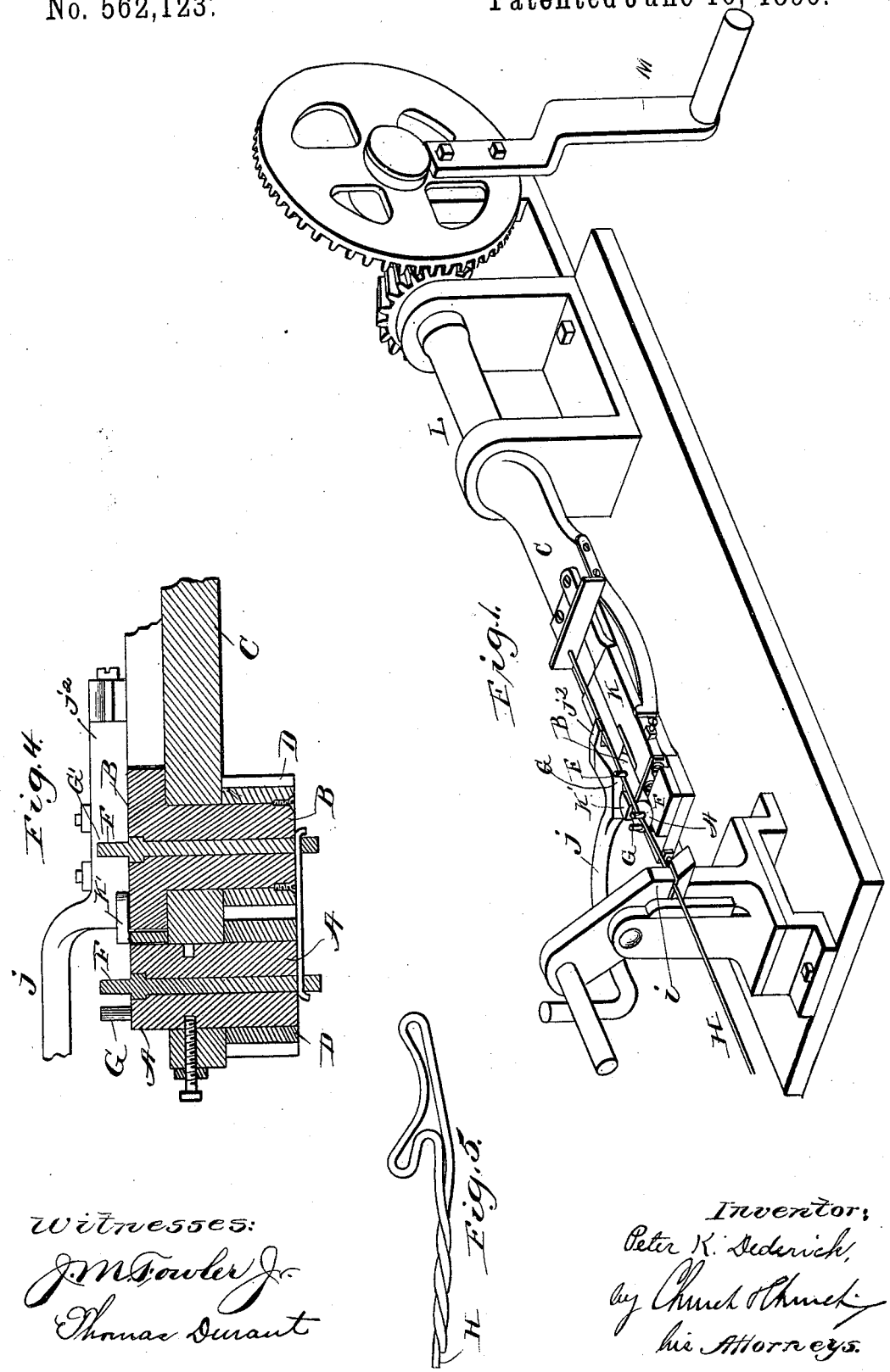
Figure 2:
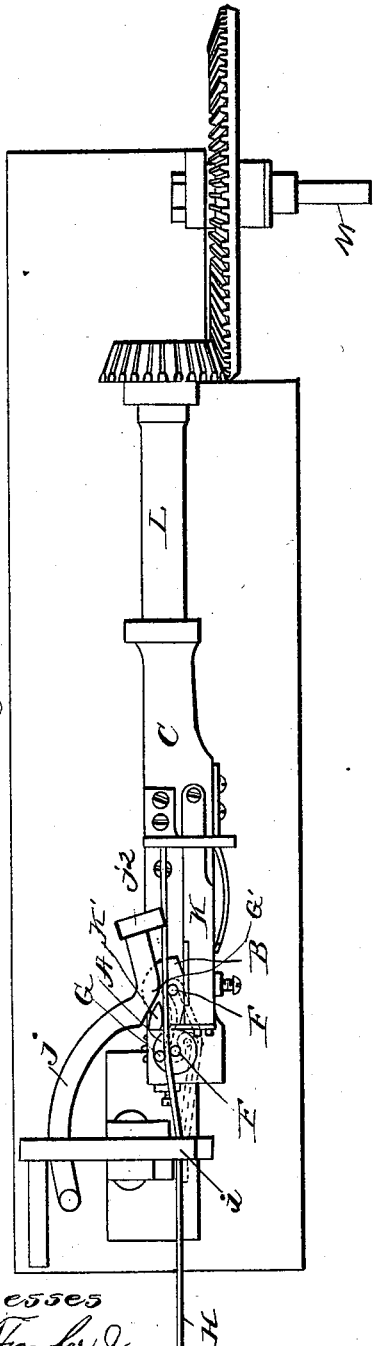
Figure 3:
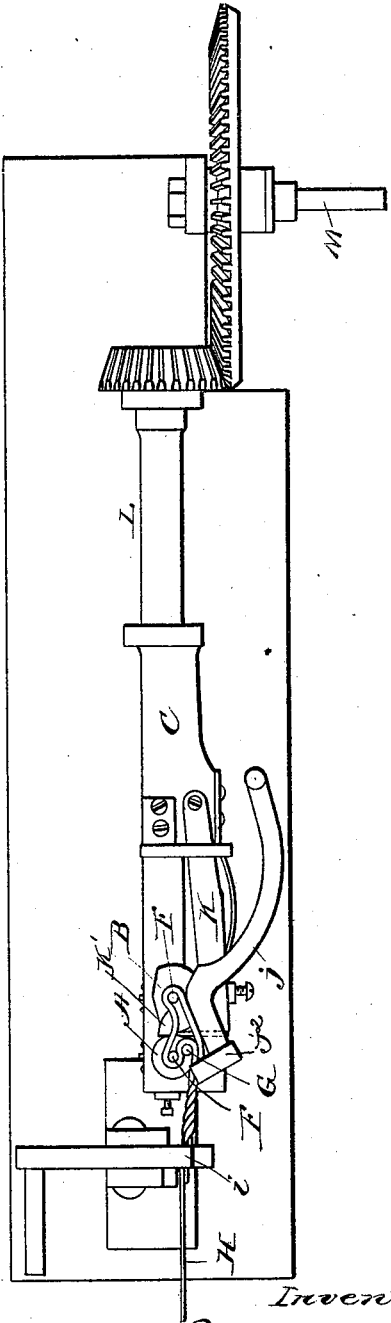

Figure 1 is a perspective view of my improved machine, illustrating its position when ready to form a cross-head. Fig. 2 is a top plan with the cross-head in dotted lines. Fig. 3 illustrates the position when the hook is folded and twisted. Fig. 4 is a detail section through the heads. Fig. 5 illustrates the completed hook or cross-head.

Similar letters represent similar parts.

A and B are two heads or ends of shafts. C is a bearing-plate in which they are journaled, extending through it and geared together by means of gearing D D, so that they must move together and in opposite directions. At or near the center of each of these disks or shaft ends A and B, I secure a projection or pivot F, which may be rigidly secured to the head or disks and turn with them, or may be made stationary pivots by securing them above or below the heads to prevent them from turning, as I have shown them in Fig. 4, and at one side near each of these pivots another projection, as G G', is placed, and between which projection of both disks the end of the wire H is placed, as shown in Fig. 1, extending back through the vise $i$, which secures it when being twisted. The projection G' is shown as a part of handle $j$, to be presently described.

The shafts or disks A and B may be operated by hand or power in any suitable manner. I have shown a hand-lever or handle $j$ attached to so as to turn with one of the gears B, which being moved a half-turn revolves the heads A and B part way around, the head A making a fold in the wire, and the head B folding the end of the wire back, all as shown in Fig. 3, the folded end extending back through the vise $i$, in which it is clamped with the body of the wire and twisted together with it between the vise and the folding-heads A and B, either by revolving the folding-heads or the vise, or both. I have shown it constructed to twist by revolving the folding-head bearing-plate.

The base $j^2$ of the handle $j$ is so shaped and attached as to form a projection which operates in its movement to clamp against the wires at or near the disk A and hold them firmly, as shown in Fig. 3, and, in order to give a curved or concave face to the face of the hook, as shown, I attach a cam-bar K to the bearing-plate, provided with a bearing-head K', as shown, and operated in any suitable manner or, as shown, by the disk B, which is constructed eccentric or cam shaped, so as to move the head and bend the wire in before or while being folded.

The shape and locations of the projections on the disks A and B may be varied, as all that is required is two projections on each disk, the one projection to have a circular movement about the other, and to rotate in an opposite direction from that of the pivot of the other disk, to which it is preferably geared either directly or indirectly. Power may be applied in any suitable manner to operate these folding-heads, or they may be rotated by hand, as shown, and they may be stationary and the vise revolved to form the twist, or the folding-heads revolved by power or hand-crank, as shown, the bearing-plate C being a projection from the journaled shaft L, to which the crank M is attached.

Having thus fully described my improvements, I claim and desire to secure by Letters Patent—

1. In a bale-tie-forming machine, the combination with a vise or clamp, of the two oscillatory members or disks having projections thereon and arranged one nearer to the vise than the other, whereby the wire may be doubled back on itself by the farther head and given an intermediate bend by the intermediate head; substantially as described.

2. In a bale-tie machine, the combination with the vise or clamp, of the two oscillatory members or disks arranged one nearer to the vise than the other, projections on the disks or members for coöperating with the wire to bend the same, and an extended projection on the disk or member farthest from the vise, overlapping the intermediate disk or member for doubling and forming up, the doubled end; substantially as described.

3. In a bale-tie machine, the combination with the rotary plate or head and the vise arranged in line with the center of rotation, of the disks or rotary members A and B journaled in said plate, with wire-engaging projections on said disks or rotary members, and gearing between said disks or rotary members for revolving them in opposite directions; substantially as described.

4. In a bale-tie machine, the combination with the disks or rotary members having wire-engaging projections on their faces with means for rotating said disks or members in opposite directions, of a cam-bar movable transversely of a line between the disks or rotary members, with means for moving said cam-bar to set inward the wire held by the disks or rotary members; substantially as described.

5. In a bale-tie machine, the combination with the disks or rotary members having wire-engaging projections on their faces with means for rotating said disks or rotary members, and a rotary plate or head on which said disks or members are mounted, of a cam-bar also located on said rotary head and movable in right lines intermediate said disks or members, with mechanism interposed between the disks or rotary members and cam-bar for moving the latter; substantially as described.

PETER K. DEDERICK.

Witnesses:
W. A. SHINKLE,
M. M. LINACRE.